(12) United States Patent
Shibuya et al.

(10) Patent No.: US 12,061,348 B2
(45) Date of Patent: Aug. 13, 2024

(54) DIFFUSION PLATE AND OPTICAL DEVICE

(71) Applicant: Dexerials Corporation, Tokyo (JP)

(72) Inventors: Kazuyuki Shibuya, Tokyo (JP); Katsuhiro Shindo, Tokyo (JP); Naoki Hanashima, Tokyo (JP); Yusuke Matsuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 0 days.

(21) Appl. No.: 16/963,970

(22) PCT Filed: Jan. 21, 2019

(86) PCT No.: PCT/JP2019/001649
§ 371 (c)(1),
(2) Date: Jul. 22, 2020

(87) PCT Pub. No.: WO2019/146545
PCT Pub. Date: Aug. 1, 2019

(65) Prior Publication Data
US 2021/0003746 A1 Jan. 7, 2021

(30) Foreign Application Priority Data
Jan. 25, 2018 (JP) ................................. 2018-010755

(51) Int. Cl.
*G02B 3/00* (2006.01)
*G02B 27/48* (2006.01)

(52) U.S. Cl.
CPC ......... *G02B 3/0068* (2013.01); *G02B 3/0043* (2013.01); *G02B 27/48* (2013.01)

(58) Field of Classification Search
CPC .... G02B 3/005; G02B 3/0056; G02B 3/0062; G02B 3/0068; G02B 2003/0093; G02B 3/04; G02B 3/06; G02B 3/08
See application file for complete search history.

(56) References Cited

U.S. PATENT DOCUMENTS

| 6,295,165 B1 | 9/2001 | Nemoto et al. |
| 2002/0001133 A1* | 1/2002 | Magee ................ G02B 3/0031 359/623 |

(Continued)

FOREIGN PATENT DOCUMENTS

| CN | 101793379 A | 8/2010 |
| JP | 2000284217 A | 10/2000 |

(Continued)

OTHER PUBLICATIONS

Notice of Reasons for Rejection issued to JP Application No. 2018-010755, mailed Apr. 17, 2018.

(Continued)

*Primary Examiner* — Christopher Stanford
*Assistant Examiner* — Journey F Sumlar
(74) *Attorney, Agent, or Firm* — Osha Bergman Watanabe & Burton LLP

(57) ABSTRACT

In order to provide an optical device and a diffusion plate which has high transmittance and is capable of reducing speckle noise, the present it is a diffusion plate 1 in which a plurality of microlens cells 11 are arranged on both surfaces of a transparent substrate 10, the diffusion plate 1 having a first microlens array 12A which is formed on one surface of the transparent substrate 10 and comprises a plurality of concave or convex microlens cells 11, and a second microlens array 12B which is formed on the other surface on the reverse side from the one surface and comprises a plurality of concave or convex microlens cells 11, and the diffusion plate 1 being configured so that light emitted from the microlens cells 11 constituting the first microlens array 12A is incident on the microlens cells 11 constituting the second microlens array 12B.

8 Claims, 20 Drawing Sheets

(56) References Cited

U.S. PATENT DOCUMENTS

| | | | |
|---|---|---|---|
| 2008/0037947 A1* | 2/2008 | Chao | G02B 3/0068 385/146 |
| 2008/0259634 A1* | 10/2008 | Mi | G02B 6/0053 362/606 |
| 2015/0042542 A1 | 2/2015 | Fujikawa et al. | |
| 2015/0153639 A1* | 6/2015 | Tokunaga | G02B 5/0278 359/453 |
| 2017/0214105 A1* | 7/2017 | Oh | H01M 12/08 |
| 2018/0203334 A1 | 7/2018 | Hanashima | |
| 2018/0306404 A1 | 10/2018 | Hanashima et al. | |

FOREIGN PATENT DOCUMENTS

| | | |
|---|---|---|
| JP | 2008152040 A | 7/2008 |
| JP | 2010134345 | 6/2010 |
| JP | 2010176029 A | 8/2010 |
| JP | 2010204156 A | 9/2010 |
| JP | 2010262038 | 11/2010 |
| JP | 2012002829 A | 1/2012 |
| JP | 2012027423 A | 2/2012 |
| JP | 2012058275 | 3/2012 |
| JP | 2012215895 A | 11/2012 |
| JP | 2013051135 | 3/2013 |
| JP | 2014038314 A | 2/2014 |
| JP | 2015034877 A | 2/2015 |
| JP | 2017009669 A | 1/2017 |
| JP | 2017026662 A | 2/2017 |
| JP | 2017083815 A | 5/2017 |
| WO | WO-2017010257 A1 * | 1/2017 ............... F21V 5/04 |

OTHER PUBLICATIONS

Notice of Reasons for Rejection issued to JP Application No. 2018-010755, mailed Jul. 3, 2018.
International Search Report issued in International Application No. PCT/JP2019/001649, mailed Apr. 23, 2019 (5 pages).
Written Opinion issued in International Application No. PCT/JP2019/001649; Dated Apr. 23, 2019 (5 pages).
Office Action issued in Chinese Application No. 201980007680.0; Dated Jul. 28, 2021 (16 pages).
Office Action issued in Chinese Application No. 201980007680.0; Dated Feb. 25, 2022 (7 pages).

* cited by examiner

● : VERTEX POSITIONS WHEN LENS CELLS ARE ARRANGED REGULARLY
○ : VERTEX POSITIONS WHEN LENS CELLS ARE ARRANGED RANDOMLY

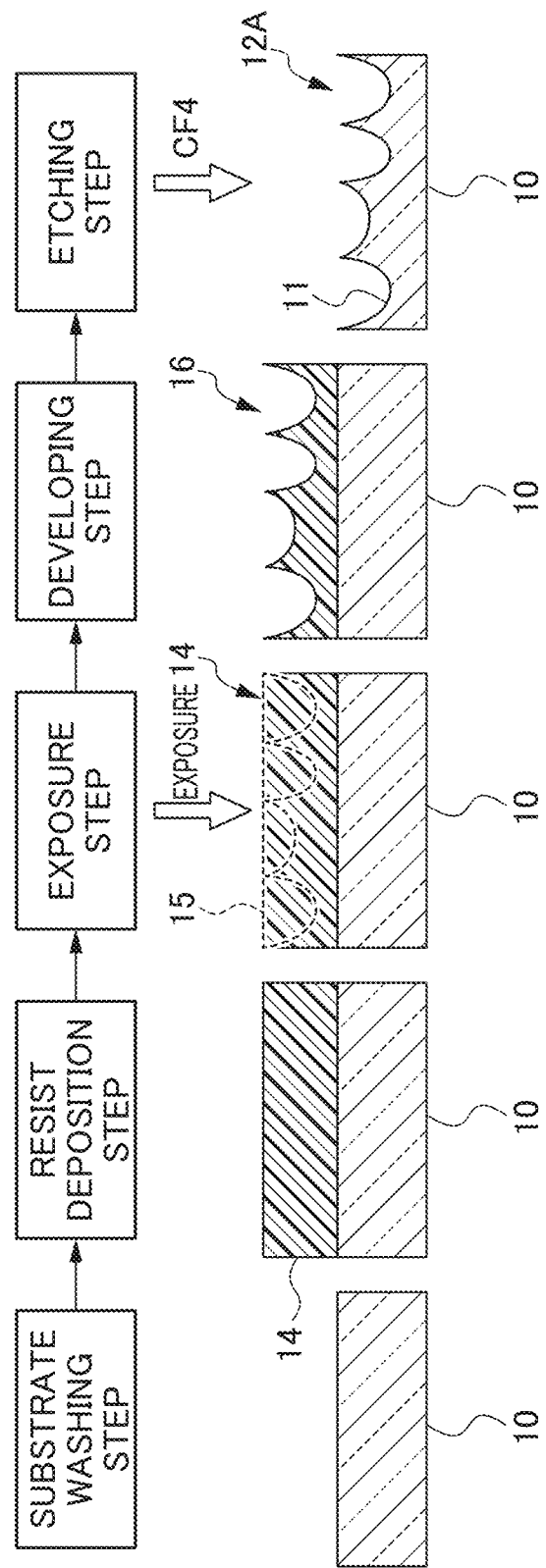

1.00°

1.00°

5.00°

5.00°

5.00°

DIFFUSION PLATE AND OPTICAL DEVICE

TECHNICAL FIELD

The present invention relates to a diffusion plate and an optical device.

BACKGROUND ART

Conventionally, a diffusion plate that scatters Incident light in various directions is broadly used in optical devices such as a projection apparatus such as a projector, a display apparatus such as a head-up display, and various lighting apparatuses. A diffusion mechanism of incident light in the diffusion plate is roughly classified into a mechanism that uses refraction of light resulting from a surface shape of a diffusion plate and a mechanism that uses scattering by a substance having a refractive index different from that of the surroundings, present inside a bulk body.

A microlens array in which a plurality of microlenses having a size of approximately several tens of μm are arranged on a surface of a bulk body is known as a diffusion plate which uses refraction of light resulting from a surface shape. Various studies have been made on the shape and the arrangement of these lenses of the microlens array. For example, the present applicants have proposed a microlens array which aims to obtain flat diffusion characteristics while suppressing high-order diffraction components and in which an appropriate aspherical component is added to a curved surface of a microlens (for example, see Patent Document 1) and a microlens array which aims to suppress unnecessary diffraction components and in which the ridgelines between microlenses are not parallel and are not parallel to a transparent substrate (for example, see Patent Document 2).

A microlens array in which microlenses are arranged on both surfaces of a substrate is also proposed (for example, see Patent Documents 3 and 4). According to these microlens arrays, it is said that a microlens array having high optical performance such as a variable magnification and imaging performance is obtained.

Patent Document 1: Japanese Unexamined Patent Application, Publication No. 2017-26662
Patent Document 2: Japanese Patent Application No. 2015-213465, Specification
Patent Document 3: Japanese Unexamined Patent Application, Publication No. 2000-284217
Patent Document 4: Japanese Unexamined Patent Application, Publication No. 2008-152040

DISCLOSURE OF THE INVENTION

Problems to be Solved by the Invention

However, when a single diffusion plate is used as in Patent Documents 1 and 2, depending on the shape and arrangement of lenses, bright spots (hereinafter referred to as speckle noise) having strong and weak intensity appear in emitted light at several points. For example, in a diffusion plate of periodic microlens arrays, periodic speckle noise that depends on the shape and arrangement of lenses appears in emitted light. The speckle noise causes deterioration of image quality such as color unevenness in an optical device, such as a projection apparatus or a display apparatus, for displaying images.

Therefore, conventionally, as a countermeasure against speckle noise in a laser light source projector, attempts have been made to reduce speckle noise by using two diffusion plates such as diffusion plates 101 and 102 of an optical device 100 illustrated in FIG. 8 and allowing laser light to pass through these two diffusion plates.

However, when laser light passes through two diffusion plates, there is a problem that transmittance decreases. In this regard, in Patent Documents 3 and 4, although microlens arrays are provided on both surfaces, since the same shapes are arranged periodically, it is difficult to reduce speckle noise with a single diffusion plate.

The present invention has been made in view of the above-mentioned problems, and an object thereof is to provide a diffusion plate and an optical device having high transmittance and capable of reducing speckle noise.

Means for Solving the Problems

In order to attain the object, the present invention provides a diffusion plate in which a plurality of microlens cells are arranged on both surfaces of a transparent substrate, including: a first microlens array formed on one surface of the transparent substrate and composed of a plurality of concave or convex microlens cells; and a second microlens array formed on the other surface on a reverse side from the one surface and composed of a plurality of concave or convex microlens cells, wherein light emitted from microlens cells forming the first microlens array is incident on microlens cells forming the second microlens array.

At least one of the first and second microlens arrays may be a random microlens array.

A shape of the microlens cells forming the first microlens array may be circular or elliptical, and a shape of the microlens cells forming the second microlens array may be circular or elliptical.

The diffusion plate may be formed of an inorganic material only.

The present invention provides an optical device including a diffusion plate according to any one of the above-mentioned embodiments.

Effects of the Invention

According to the present invention, it is possible to provide a diffusion plate and an optical device having high transmittance and capable of reducing speckle noise.

BRIEF DESCRIPTION OF THE DRAWINGS

FIG. 6A is a diagram illustrating an example of a diffusion plate manufacturing method according to the present invention.

PREFERRED MODE FOR CARRYING OUT THE INVENTION

Figure 1:
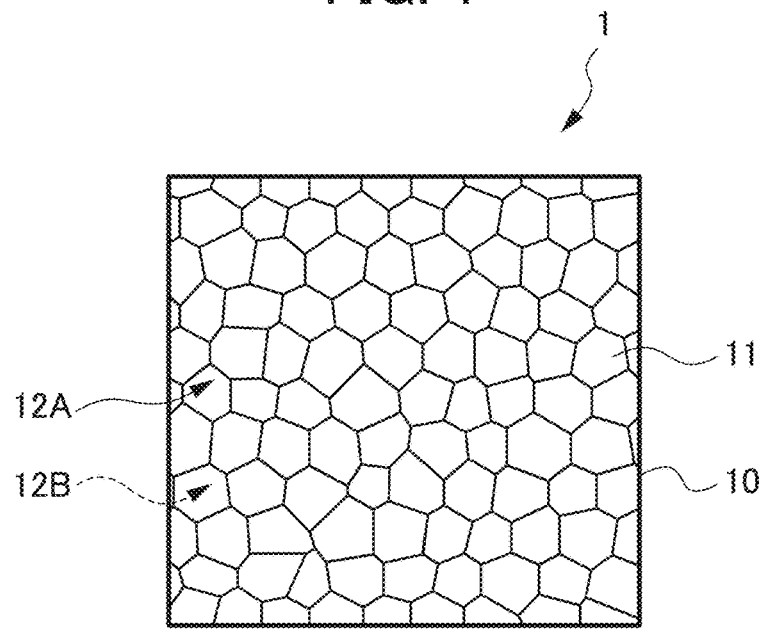
FIG. 1 is a plan view of a diffusion plate according to an embodiment of the present invention.

Hereinafter, an embodiment of the present invention will be described in detail with reference to the drawings. FIG. 1 is a plan view schematically illustrating a diffusion plate according to an embodiment of the present invention and FIG. is a cross-sectional view schematically illustrating the diffusion plate according to the embodiment. A diffusion plate 1 according to the present embodiment is a microlens array-type double-sided diffusion plate in which a plurality of microlens cells (hereinafter lens cells) 11 are arranged on both surfaces of a substrate. The diffusion plate 1 includes a transparent substrate 10 and a first microlens array (hereinafter a first lens array) 12A and a second microlens arrays (hereinafter a second lens array) 12B each composed of a plurality of lens cells 11 formed on both surfaces of the transparent substrate 10. Although the diffusion plate 1 is generally composed of a plurality of unit cells (not illustrated), a portion of the unit cell cut in a rectangular form is schematically illustrated in FIG. 1.

<Transparent Substrate 10>

The transparent substrate 10 is a substrate formed of a material that can be regarded as transparent in a wavelength band of light incident on the diffusion plate 1 according to the present embodiment. The substrate material may be a known resin material, for example, and may be a known optical glass formed of an inorganic material such as quartz glass, borosilicate glass, or white plate glass. However, preferably, an entire substrate including a lens portion (the plurality of lens cells 11) is formed of an inorganic material only. Since the substrate of the diffusion plate 1 is formed of an inorganic material only, particularly, when high-power laser light is used as incident light, diffusion characteristics will not deteriorate due to alteration of an organic material. An outer shape of the transparent substrate 10 is not particularly limited and an arbitrary shape may be used depending on the shape of an optical device such as a projection apparatus, a display apparatus, or a lighting apparatus on which the diffusion plate 1 is mounted, for example.

<First and Second Lens Arrays 12A and 12B>

Figure 2:
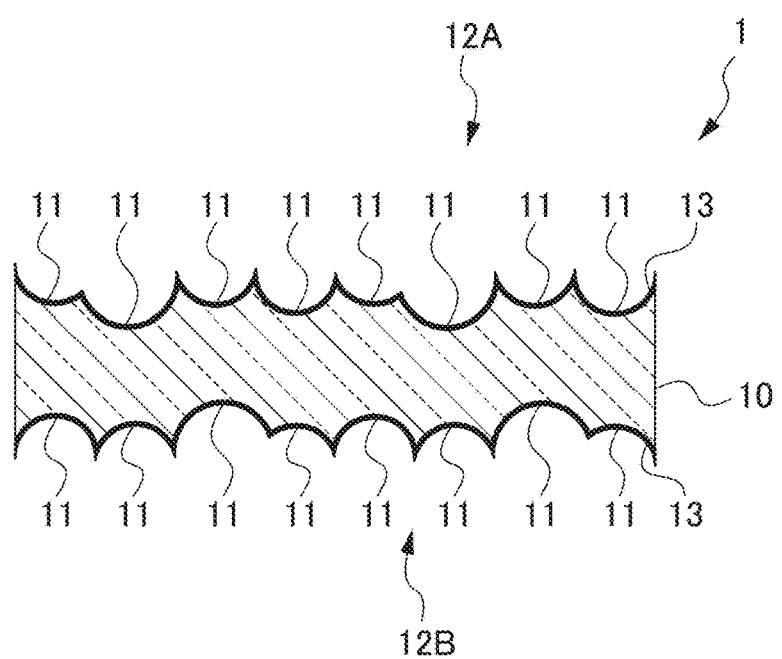
FIG. 2 is a cross-sectional view of the diffusion plate according to the embodiment.

In the diffusion plate 1, a first lens array 12A composed of a plurality of lens cells 11 is formed on one surface of the transparent substrate 10, and a second lens array 12B composed of a plurality of lens cells 11 is formed on the other surface which is a surface on the reverse side from the one surface. Although each of the lens cells 11 of the first and second lens arrays 12A and 12B illustrated in FIGS. 1 and 2 is formed of a concave lens formed of a lens having a concave shape, the present invention is not limited thereto, and the lens cells 11 of each of the first and second lens arrays 12A and 12B may be formed of a convex lens formed of a lens having a convex shape. In the diffusion plate 1 illustrated in the present embodiment, the surface on which the first lens array 12A is arranged is an incident surface, and a surface on which the second lens array 12B is arranged in an emitting surface.

The lens cells 11 of the first and second lens arrays 12A and 12B of the diffusion plate 1 are arranged such that the vertices of the lens cells 11 are arranged in a polygonal form. As schematically illustrated in FIG. 1, the plurality of lens cells 11 are arranged to be adjacent to each other (that is, a gap (a flat portion) serving as a non-lens region is not present between adjacent lens cells 11). When the lens cells 11 are arranged without any gap on both surfaces of the transparent substrate 10 (that is, the lens cells 11 are arranged with a filling rate of 100%), it is possible to suppress components of incident light passing through the diffusion plate 1 without being scattered. As a result, the diffusion plate 1 having the first and second lens arrays 12A and 12B in which the plurality of lens cells 11 are arranged to be adjacent to each other without any gap can further improve diffusion performance.

In the first and second lens arrays 12A and 12B of the diffusion plate 1, an inter-lens pitch of adjacent lens cells 11 is smaller than an incident light diameter. Specifically, an inter-lens pitch is equal to or smaller than approximately ⅓ of an incident light diameter. Particularly, under use conditions of the diffusion plate 1 which uses laser light as incident light, it is considered that the incident light diameter is approximately 3 mm at maximum. Therefore, as long as the inter-lens pitch is 1 mm or smaller, the diffusion plate 1 that can be ideally used in any laser light source is obtained.

In the diffusion plate 1 of the present embodiment, the lens cells 11 forming each of the first and second lens arrays 12A and 12B are arranged so that the following three conditions are satisfied.

(1) The boundaries of the four sides of a unit cell are not discontinuous in the pattern of an array arrangement.
(2) A plane position and a height position (that is, the lowest depth position of a concave lens) of the vertex of each lens cell 11 and an inter-lens ridgeline of adjacent lens cells 11 are made irregular (random) so that diffraction is suppressed sufficiently.
(3) A non-lens region is not formed between adjacent lens cells 11 so that non-diffused transmitted light is suppressed.

In this case, "irregular (random)" means that there is not substantially on regularity (periodicity) regarding the arrangement of the lens cells 11 in an arbitrary region of the first and second lens arrays 12A and 12B of the diffusion plate 1. Therefore, even if there is some kind of regularity (periodicity) in the arrangement of the lens cells 11 in a very small region of an arbitrary region, it is assumed that no regularity (periodicity) in the arrangement of the lens cells 11 in the entire arbitrary region is included in "irregular (random)". In the first and second lens arrays 12A and 12B, in addition to the arrangement of the lens cells 11, at least any one of the radius of curvature of the lens cell 11 and the depth (height) of the lens cell 11 may be "irregular (random)".

In the first and second lens arrays 12A and 12B of the diffusion plate 1 of the present embodiment in which the lens cells 11 are arranged to satisfy the three conditions, the ridgelines between adjacent lens cells 11 are not parallel to each other and are not parallel to the transparent substrate 10. This is because diffracted light components increase when parallel ridgelines are present between the lens cells 11.

In this case, "ridgeline" indicates a linear region in which the radius of curvature of the lens cell 11 changes abruptly in an adjacent lens boundary portion in which a plurality of lens cells 11 are adjacent to each other. Although the width of such a ridgeline is equal to or smaller than approximately the wavelength of normal light, the width of the ridgeline is controlled by a process condition of etching or the like so that diffracted light has an appropriate size. "Not parallel" includes a case in which at least one of two lines used for determining whether the lines are parallel is a curved line. Specifically, a region of a lens cell surrounded by adjacent lens cells 11 forms a polygon when seen from an optical axis direction of the lens cell 11, and each side of the polygon forms a curved line when seen from a cross-section of the lens cell 11.

<Relationship between Lens Cell 11 on Incident Surface and Lens Cell 11 on Emitting Surface>

The diffusion plate 1 according to the present invention is configured such that light emitted from the lens cells 11 forming the first lens array 12A passes through the inside of the transparent substrate 10 and is incident on the lens cells 11 forming the second lens array 12B. That is, light emitted from the lens cells 11 forming the first lens array 12A passes through a lens region inside the ridgelines that define the periphery of the lens cells 11 forming the second lens array 12B.

Light emitted from any one of the lens cells 11 of the first lens array 12A may be incident on at least one lens cell 11 of the second lens array 12B. That is, light emitted from one lens cell 11 of the first lens array 12A is incident on at least one lens cell 11 of the second lens array 12B and is emitted from the lens cell 11 of the second lens array 12B toward the emitting surface of the diffusion plate 1. Since light is further diffused by the lens cell 11 of the second lens array 12B after being diffused by the lens cell 11 of the first lens array 12A, speckle noise is reduced. Since the diffusion plate 1 has the first lens array 12A on one surface of the transparent substrate 10 and the second lens array 12B on the other surface, the diffusion plate 1 can have higher transmittance (approximately 99.5%) than the transmittance (approximately 99%) of the diffusion plates 101 and 102 of the optical device 100 illustrated in FIG. 8, for example, in which light sequentially passes through two independent diffusion plates arranged to be separated from each other.

Figure 3:
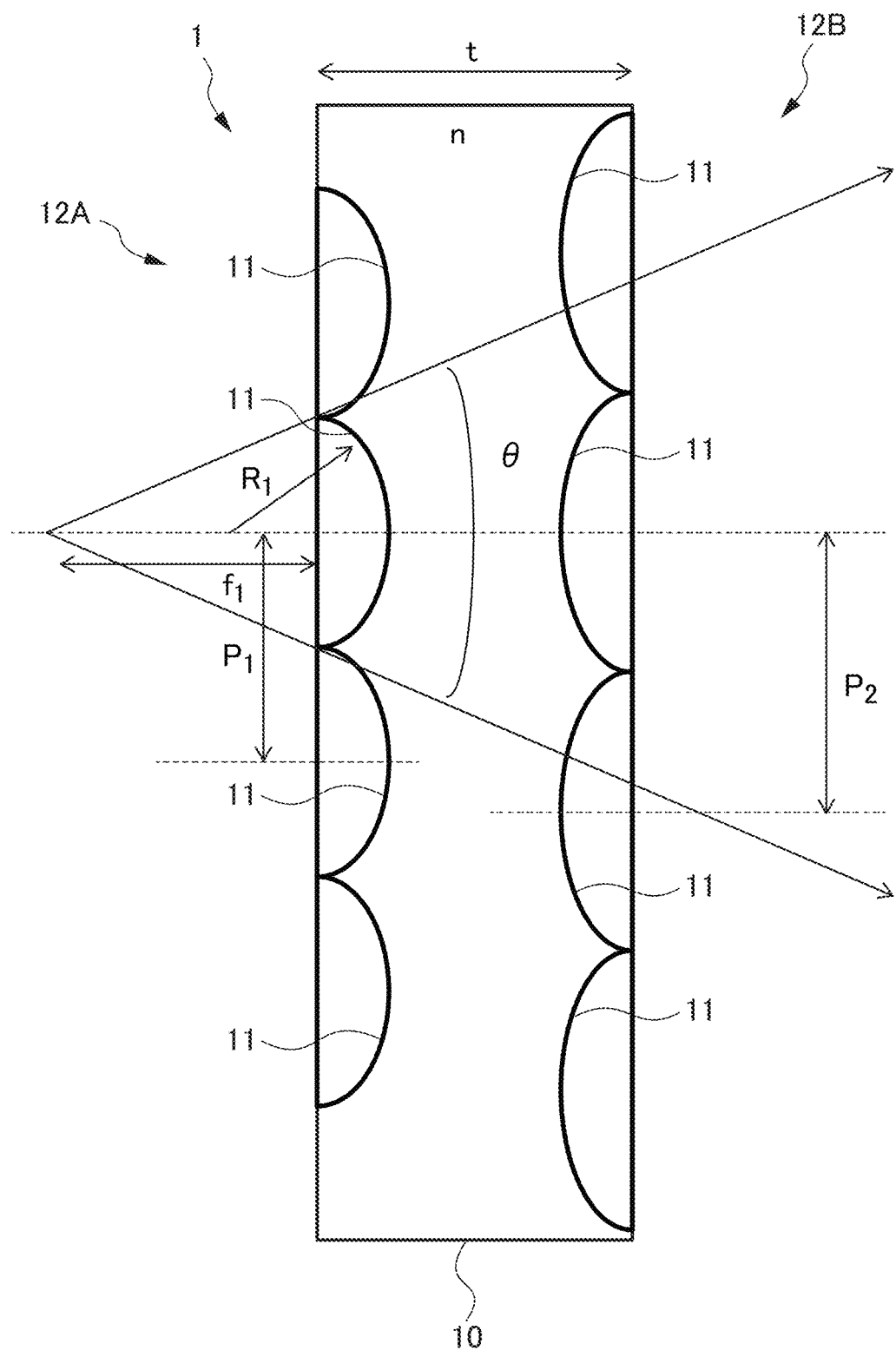
FIG. 3 is a schematic diagram illustrating a relationship between a microlens cell composed of concave lenses on an incident surface of the diffusion plate according to the embodiment and a microlens cell on an emitting surface.
Figure 4:
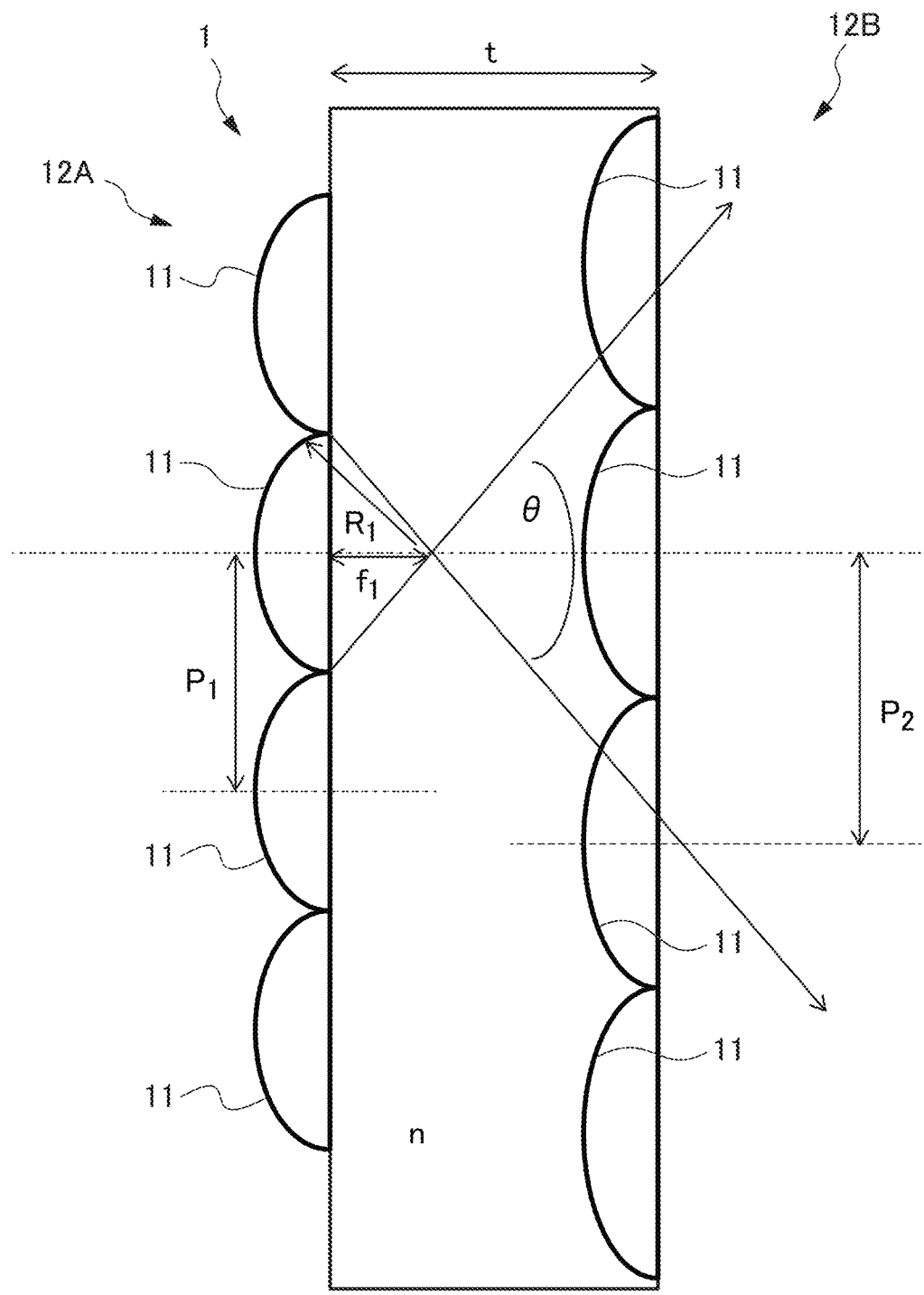
FIG. 4 is a schematic diagram illustrating a relationship between a microlens cell composed of convex lenses on an incident surface of the diffusion plate according to the embodiment and a microlens cell on an emitting surface.

Next, a relationship between the lens cell 11 on the incident surface of the diffusion plate 1 and the lens cell 11 on the emitting surface will be described further with reference to FIGS. 3 and 4. FIGS. 3 and 4 are schematic diagrams illustrating a relationship between the lens cell 11 on the incident surface of the diffusion plate 1 according to the present embodiment and the lens cell 11 on the emitting surface. FIG. 3 illustrates a case in which the lens cell 11 on the incident surface is a concave lens and FIG. 4 illustrates a case in which the lens cell 11 on the incident surface is a convex lens. In the diffusion plate 1 in which the lens cells 11 are arranged randomly on both surfaces thereof according to the present embodiment, a diffusion angle (a full width at half maximum) of the first lens array 12A which is the emitting surface is represented by Expression 1 below using an average pitch (the average distance between the vertices of the lens cells 11) $P_1$ of the lens cells 11, a refractive index n of the transparent substrate 10, and an average radius of curvature $R_1$ of the lens cells 11.

[Math. 1]

$$\theta = 2\sin^{-1}\left[\frac{P_1(n-1)}{2R_1}\right] \quad \text{(Expression 1)}$$

A focal distance $f_1$ of the lens cells 11 formed randomly on the emitting surface (the surface on which the lens arrays 12A are arranged) is represented by Expression 2 below.

[Math. 2]

$$f_1 = \frac{R_1}{2(n-1)} \quad \text{(Expression 2)}$$

In this case, as illustrated in FIG. 3, when the lens cell 11 on the incident surface is a concave lens, the lens cell 11 on the emitting surface is a convex lens or a concave lens, an average pitch (the average distance between the vertices of the lens cells 11) of the lens cells 11 on the emitting surface is $P_2$, and the thickness of the transparent substrate 10 is t, a condition for reducing speckle noise more ideally is represented by Expression 3 below.

[Math. 3]

$$P_2 < 2(t-f_1)\tan(\theta/2) \quad \text{(Expression 3)}$$

Since the lens cell 2 on the incident surface is formed of a concave lens and the focal distance thereof is negative, when Expressions 1 and 2 are substituted in Expression 3, Expression 4 below is obtained.

[Math. 4]

$$P_2 < 2\left(t + \frac{R_1}{2(n-1)}\right)\tan\left[2\sin^{-1}\left[\frac{P_1(n-1)}{2R_1}\right]\middle/2\right] \quad \text{(Expression 4)}$$

On the other hand, as illustrated in FIG. 4, when the lens cell 11 on the incident surface is a convex lens, the lens cell 11 on the emitting surface is a convex lens or a concave lens, an average pitch (the average distance between the vertices of the lens cells 11) of the lens cells 11 on the emitting surface is $P_2$, and the thickness of the transparent substrate 10 is t, a condition for reducing speckle noise more ideally is represented by Expression 5 below. Since the lens cell 2 on the incident surface is formed of a convex lens and the focal distance thereof is positive, when Expressions 1 and 2 are substituted in Expression 3, Expression 5 below is obtained.

[Math. 5]

$$P_2 < 2\left(t - \frac{R_1}{2(n-1)}\right)\tan\left[2\sin^{-1}\left[\frac{P_1(n-1)}{2R_1}\right]\middle/2\right] \quad \text{(Expression 5)}$$

In the diffusion plate 1, since the lens cells 11 of the first lens array 12A on the incident surface and the lens cells 11 of the second lens array 12B on the emitting surface satisfy the condition of Expression 4 or 5, diffused light emitted from the lens cells 11 of the first lens array 12A is reliably incident on any one or more lens cells 11 of the second lens array 12B, and the light is further diffused in the lens cells 11 and is emitted. Therefore, the diffusion plate 1 has high light diffusion efficiency and can reduce speckle noise more ideally.

<Irregular (Random) Lens Arrangement

Figure 5:
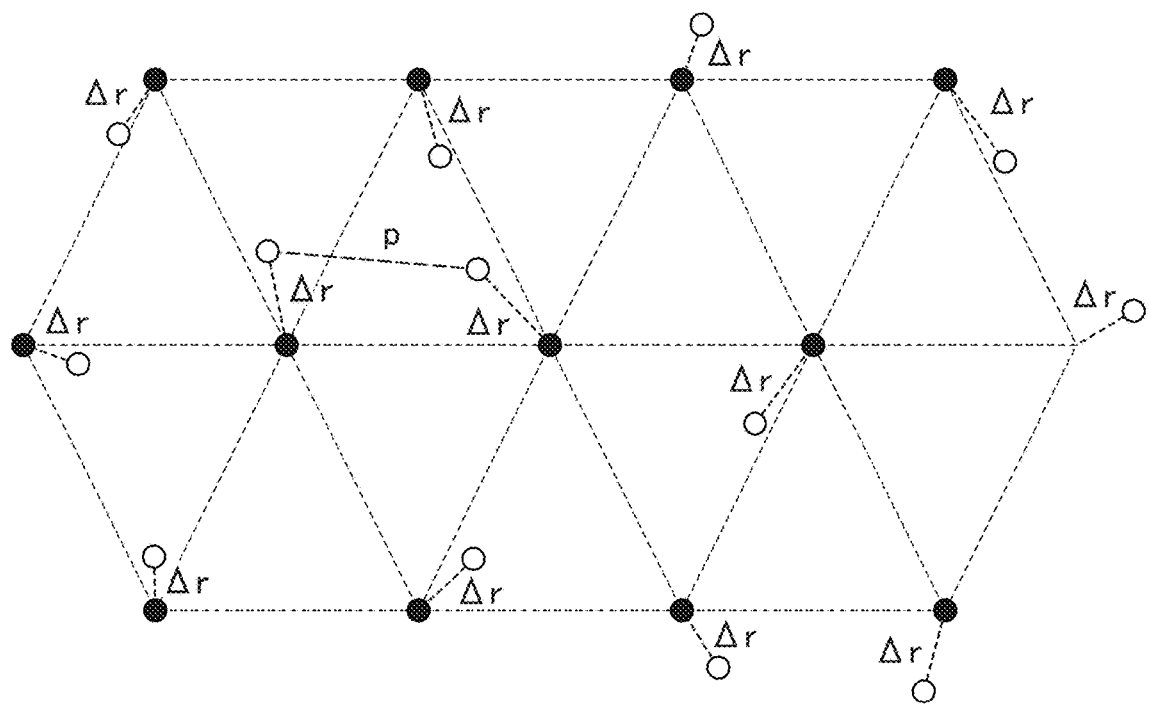
FIG. 5 is an explanatory diagram for describing an example of a method of arranging lens cells of a diffusion plate randomly.

An example of a method of arranging the lens cells 11 irregularly (randomly) will be described with reference to FIG. 5. First, a lens arrangement having regularity serving as a reference for an irregular (random) arrangement of the lens cells 11 will be focused on. As a lens arrangement having regularity, lenses are arranged in a polygonal form such as a rectangular arrangement in which vertex positions of lens cells are arranged in a square form or a hexagonal arrangement in which vertex positions of unit lenses are arranged vertices of a regular hexagon and positions corresponding to the vertices of a regular hexagon. FIG. 5 illustrates a case in which vertex positions of lens cells are arranged in a hexagonal form as a reference lens arrangement using black circles. After that, using the vertex positions of regular lens cells as initial values, the vertex positions of the lens cells are displaced randomly within the range of a radius Δr from the positions of the initial values. According to this arrangement method, two irregular (random) properties are introduced in a shift direction of the vertex position of a lens cell from a reference position and a shift amount of the vertex position of the lens cell from the reference position. In this case, since Expression 4 or 5 is satisfied for the pitch ($P_2$) of the lens cells 11 forming the second lens array 12B which is the emitting surface, it is possible to reduce speckle noise more ideally.

<Shape of Lens Cell 11>

In the diffusion plate 1, the shape of the lens cells 11 forming the lens array 12A may be circular or elliptical and the shape of the lens cells 11 forming the second lens array 12B may be circular or elliptical. That is, the shape of the lens cells 11 arranged on each surface of the diffusion plate 1 is not limited to an ordinary circular shape but may be an elliptical shape. The shape of the lens cell 11 being circular or elliptical means that an intensity distribution of light having passed through the optical axis of the lens cell 11 is circular or elliptical.

When the lens cell 11 is elliptical, the lens cells 11 are oriented so that the major axis directions and the minor axis directions of all lens cells 11 arranged on the same surface of the diffusion plate 1 each are aligned. When the shape of the lens cells 11 forming the first lens array 12A of the diffusion plate 1 and the shape of the lens cells 11 forming the second lens array 12B are all elliptical, the major axis direction and the minor axis direction of the lens cells 11 forming the first lens array 12A and the major axis direction and the minor axis direction of the lens cells 11 forming the second lens array 12B are oriented so as to be shifted by 90°. In this way, even when the lens cell 11 is elliptical, the distribution of a diffusion angle of diffused light emitted from the diffusion plate 1 becomes uniform in the XY directions equally to that when the lens cell 11 is circular, and satisfactory diffusion performance is obtained.

<Anti-Reflection Film>

As illustrated in FIG. 2, an anti-reflection film 13 called AR coat (Anti-Reflection Coating) may be formed on both surfaces of the diffusion plate 1 in order to prevent increase in transmittance and reflected stray light. An ordinary dielectric transparent film such as, for example, $SiO_2$, $Al_2O_3$, $MgF_2$, $CeO_2$, $TiO_2$, $Ta_2O_5$, $Nb_2O_5$, $Y_2O_3$, $Tb_2O_3$, ZnS, or $ZrO_2$ can be used as the anti-reflection film 13. Particularly, when incident light has high light intensity due to a high-power laser or the like, materials having high light resistance such as, for example, $Ta_2O_5$ or $SiO_2$ are preferably used. When the anti-reflection film 13 is formed on the diffusion plate 2, since unevenness resulting from the lens cells 11 is present on the surface, the film thickness may be different from the central portion to the peripheral portion of the lens cell 11. Since an incidence angle of incident light is different from the central portion to the peripheral portion of the lens cell 11, it is necessary to take measures such as making an angular range assumed in design wider than usual.

<Method of Manufacturing Diffusion Plate 1>

Figure 6B:
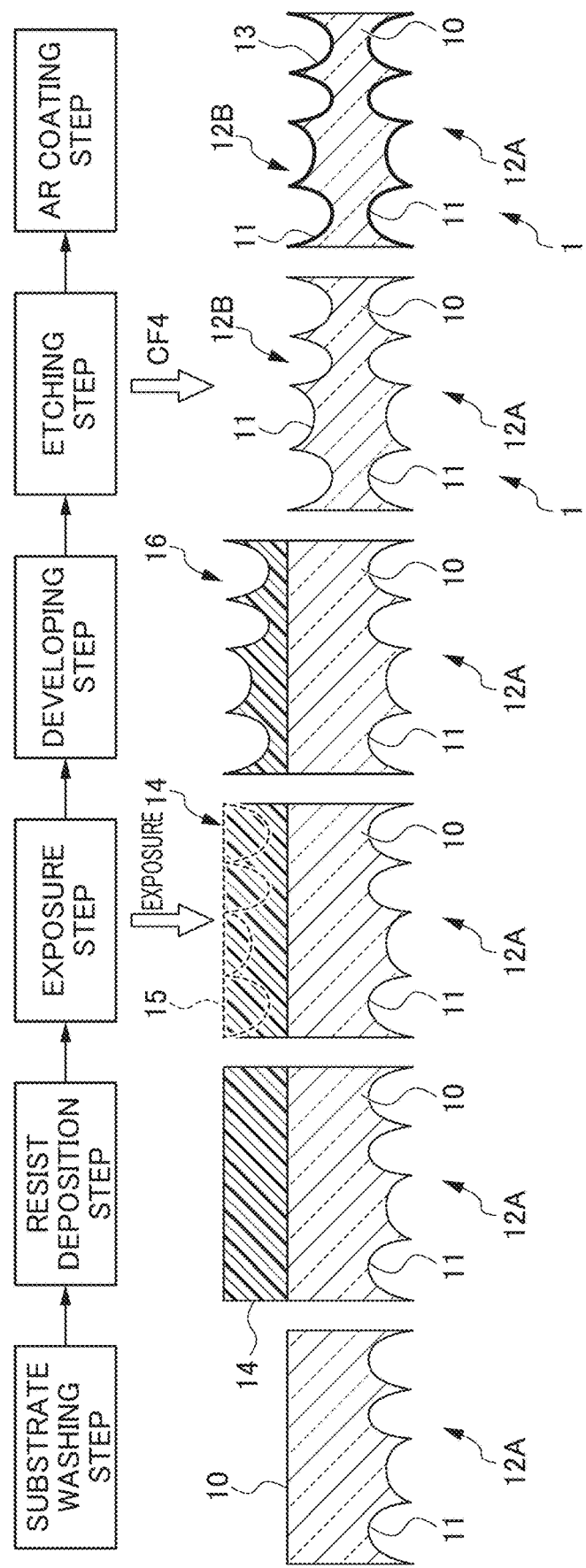
FIG. 6B is a diagram illustrating an example of a diffusion plate manufacturing method according to the present invention.

Next, an example of a method of manufacturing the diffusion plate 1 illustrated in the present embodiment described above will be described briefly with reference to FIGS. 6A and 6B. The diffusion plate 1 illustrated in the present embodiment is mainly manufactured through a substrate washing step, a resist deposition step, an exposure step, a developing step, and an etching step. That is, the diffusion plate 1 illustrated in the present embodiment is manufactured by forming a resist on a transparent substrate, exposing the resist to light and developing the resist to form a pattern serving as the lens cells 11, and transferring the pattern to the substrate by etching.

First, in FIG. 6A, in a substrate washing step, the transparent substrate 10 such as a glass substrate serving as a substrate material is washed with a washing agent. After the transparent substrate 10 after washing is dried, a resist is deposited to one surface of the transparent substrate 10 in a resist deposition step. In the resist deposition step, a resist 14 such as, for example, a photoresist formed of an organic material is deposited to one surface or the transparent substrate 10.

The resist 14 after exposure and developing is dry-etched by etching gas in an etching step to be described later. Since fluorine-based etching gas such as $CF_4$, $SF_6$ or $CHF_3$ is generally used as etching gas, quartz glass or Tempax glass that does not contain alkaline components such as $Al_2O_3$ or alkaline metal that reacts with the fluorine-based etching gas to become nonvolatile substance (or the content of alkaline components is 20 mass % or smaller or more preferably 10 mass % or smaller) is preferably used as the transparent substrate 10. For example, when a glass substrate (for example, product name: Eagle XC of Corning) that contains 27% of $Al_2O_3$ and does not contain alkaline metal at all is dry-etched using the fluorine-based etching gas, fine projections of $Al_2O_3$ which is not etched may be formed on the surface and transmittance may decrease.

Subsequently, a desired pattern is formed by exposure to the resist 14 deposited to one surface of the transparent substrate 10 using a grayscale mask. Exposure using a grayscale mask involves controlling the amount of transmitted light depending on the shade of the mask portion. That is, light reaches a deep part of the resist 14 in a portion where the amount of transmitted light is large whereas light reaches a shallow part of the resist 14 in a portion where the amount of transmitted light is small. In this manner, in exposure using a grayscale mask, random three-dimensional exposure is performed on the resist 14. A resist portion 15 of the resist 14 that became light-sensitive by exposure is easily removed in a subsequent developing step.

In a developing step, an unnecessary resist portion 15 that became light-sensitive by exposure in the exposure step is developed and removed from the resist 14 on the transparent substrate 10. In this way, a desired lens cell pattern 16 in which recesses corresponding to lens cells are arranged randomly is formed on one surface of the transparent substrate 10.

Subsequently, in an etching step, the transparent substrate 10 in which developing has been finished and the lens cell pattern 16 is formed on one surface thereof is dry-etched using the fluorine-based etching gas. In this way, the lens cell pattern 16 formed by the resist 40 is transferred to the transparent substrate 10, and the transparent substrate 10 having the first lens array 12A in which a plurality of lens cells 11 are arranged randomly on one surface thereof is obtained.

The shape of the lens cell pattern 16 transferred to the transparent substrate 10 is determined by taking a dry etching condition into account as well as a grayscale mask exposure condition. When the ratio (=(transparent substrate etching rate)/(resist etching rate)) between an etching rate or the resist 14 in dry etching and an etching rate of the transparent substrate 10 (for example, glass or the like) is an "etching selection ratio", the etching selection ratio can be changed by adjusting the flow rate ratio of respective etching gases in the etching step. In this way, it is possible to finely adjust a lens shape (for example, the radius of curvature of the lens cell 11) to be transferred.

Specifically, when $CF_4$, Ar, and $O_2$ are used as etching gases and a flow rate ratio (=("flow rate of $CF_4$ gas")/("flow rate of Ar gas")) within the range of 0.25 to 4, the etching selection ratio changes from 1.0 to 1.7. When 3% to 10% of $O_2$ gas is added in this state, the etching selection ratio can be reduced to 0.7 to 1.0. In this manner, depending on the etching gas condition, the etching selection ratio can be changed from 0.7 to 1.7. Such a phenomenon means that the radius of curvature of the lens cell pattern 16 obtained by grayscale exposure can be adjusted in the range of 70% to 170% by etching.

Subsequently, a plurality of lens cells 11 arranged randomly is also formed on the other surface of the transparent substrate 10. Since the diffusion plate 1 illustrated in the present embodiment is a double-sided diffusion plate in which the lens cells are arranged randomly on both surfaces of the transparent substrate 10, the lens cells 11 are arranged randomly on the other surface of the transparent substrate 10 obtained through the above-described steps according to steps similar to the steps described above. That is, as illustrated in FIG. 6B, a substrate washing step, a resist deposition step, an exposure step, a developing step, and an etching step are performed on the other surface of the transparent substrate 10 completely similarly to FIG. 6A. In this way, the diffusion plate 1 illustrated in the present embodiment in which the second lens array 12B having the plurality of lens cells 11 arranged randomly is formed on the other surface of the transparent substrate 10 is obtained.

After that, an AR coating step is performed. In the AR coating step, an anti-reflection film 13 is formed on both surfaces of the diffusion plates 1 in which the first and second lens arrays 12A and 12B are formed using the above-described dielectric film by deposition or sputtering.

Although a resist deposition step, an exposure step, a developing step, and an etching step are performed on both surfaces of one transparent substrate 10 to manufacture the diffusion plate 1 in which the lens cells 11 are arranged randomly on both surfaces of one transparent substrate 10 in the above-described manufacturing method, there is no limitation thereto. For example, two transparent substrates 10 having the lens cells 11 on single side only obtained by the manufacturing steps illustrated in FIG. 6A may be prepared and the two transparent substrates 10 may be bonded and integrated in a state in which the surfaces having the lens cells 11 formed thereon face outward. In this way, the diffusion plate 1 in which the lens cells 11 are arranged randomly on both surfaces of one integrated transparent substrate 10 may be manufactured.

In the above description, although the diffusion plate 1 in which the lens cells 11 of both the first and second lens arrays 12A and 12B are arranged randomly has been illustrated, there is no limitation thereto. The diffusion plate 1 may be configured such that the lens cells 11 of at least one of the first and second lens arrays 12A and 12B may be arranged randomly.

<Optical Device>

The diffusion plate 1 according to the present embodiment is mounted on an optical device in which it is necessary to diffuse light from a light source. Examples of the optical device in which it is necessary to diffuse light from a light source include a projection apparatus such as a projector, a display apparatus such as a head-up display, and various lighting apparatuses. Particularly, the diffusion plate 1 according to the present invention can be ideally used in optical devices for use in which occurrence of color unevenness is a problem.

Figure 7:
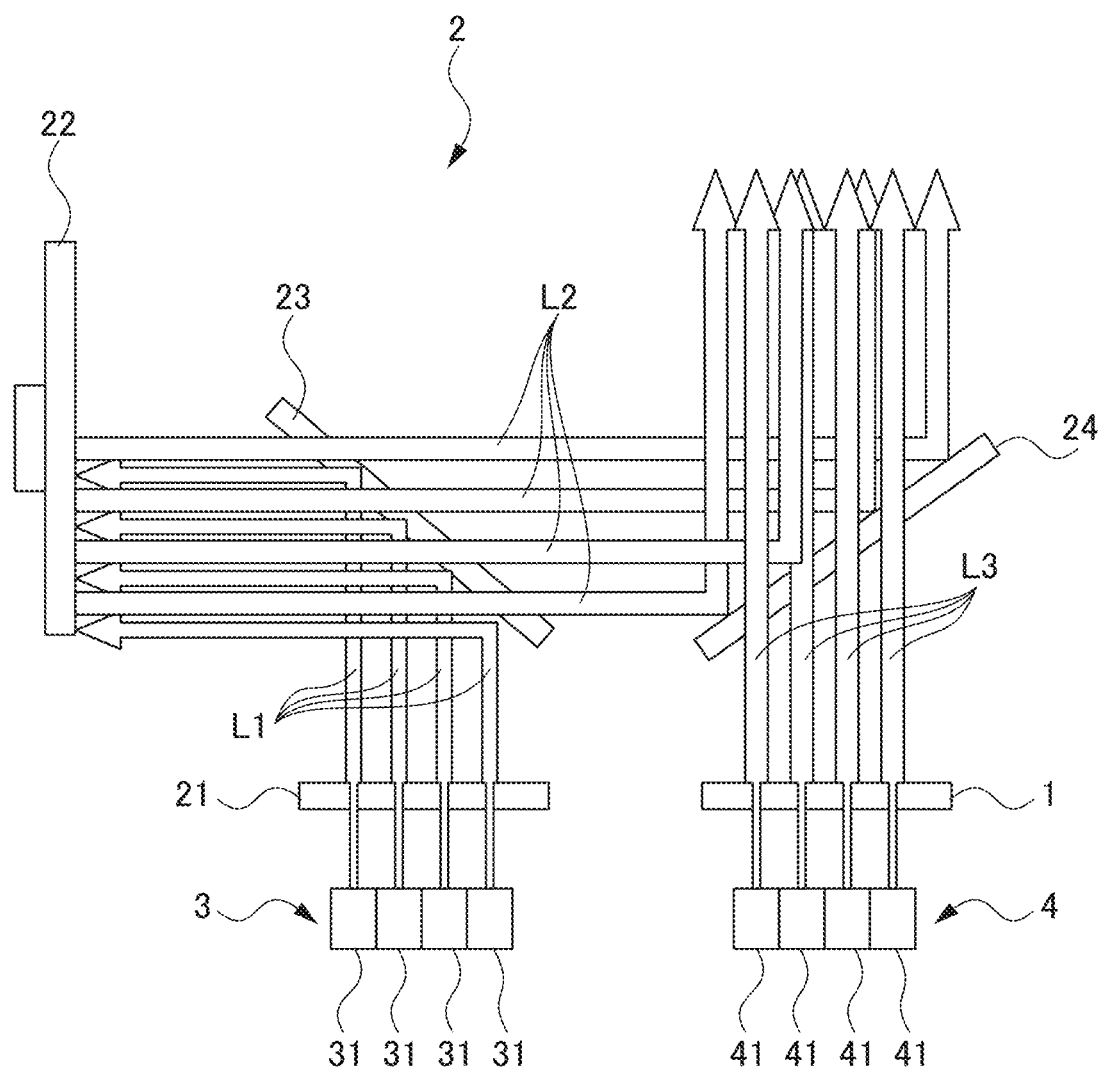
FIG. 7 is a diagram schematically illustrating an embodiment of an optical device according to the present invention.

FIG. 7 is a diagram schematically illustrating an embodiment of an optical device on which the diffusion plate 1 is mounted. The optical device illustrates a projector 2 configured to emit diffused white light using a plurality of blue LDs (laser diodes) 31, 41 as light sources 3 and 4, and FIG. 7 schematically illustrates a configuration of a light radiation portion of the projector 2.

In the projector 2, blue light L1 emitted from blue LDs 31 of one light source 3 is diffused by transmitting through one diffusion plate 21 in which a plurality of lens cells having diffusion characteristics of a diffusion angle of 5° are arranged on an emitting surface only and is incident on a first dichroic mirror 23. The first dichroic mirror 23 has a property of reflecting blue light and allowing yellow light to pass therethrough. Therefore, the blue light L1 incident on the first dichroic mirror 23 is reflected from the first dichroic mirror 23 and is incident on a phosphor wheel 22.

The phosphor wheel 22 has a phosphor layer on an incident surface thereof and is excited when the blue light L1 is radiated to the phosphor layer to emit yellow light L2 composed of yellow fluorescence. The yellow light L2 emitted from the phosphor wheel 22 passes through the first dichroic mirror 23 and is incident on a second dichroic mirror 24. The second dichroic mirror 24 has a property of reflecting yellow light and allowing blue light to pass therethrough. Therefore, the yellow light L2 incident on the second dichroic mirror 24 is reflected from the second dichroic mirror 24.

Blue light L3 emitted from blue LDs 41 of the other light source 4 is diffused by passing through one diffusion plate 1 according to the present embodiment. In the diffusion plate 1 illustrated in FIG. 7, the lens cells 11 on the incident surface (the first lens array 12A) has a diffusion angle of 5°, and the lens cells 11 on the emitting surface (the second lens array 12B) has a diffusion angle of 10°. Blue light L3 diffused by passing through the diffusion plate 1 passes through the second dichroic mirror 24 and is mixed with the yellow light L2 from the phosphor wheel 22 reflected from the second dichroic mirror 24. In this way, the projector 2 radiates light visually recognized as white light.

According to the projector 2 having such a configuration or the light radiation portion, since the blue light L3 emitted from the blue LDs 41 of the light source 4 is diffused by passing through the diffusion plate 1 according to the present invention, speckle noise is reduced. Therefore, occurrence of color unevenness resulting from speckle noise is suppressed. Since the diffusion plate 1 has the lens cells 11 arranged on both surfaces of one transparent substrate 10, the diffusion plate 1 can have higher transmittance substrate 10, the conventional optical device 100 illustrated in FIG. 8 in which two independent diffusion plates 101 and 102 having lens cells on one surface only are arranged to be separated from each other. Therefore, the projector 2 can radiate brighter light than a conventional projector.

Figure 8:
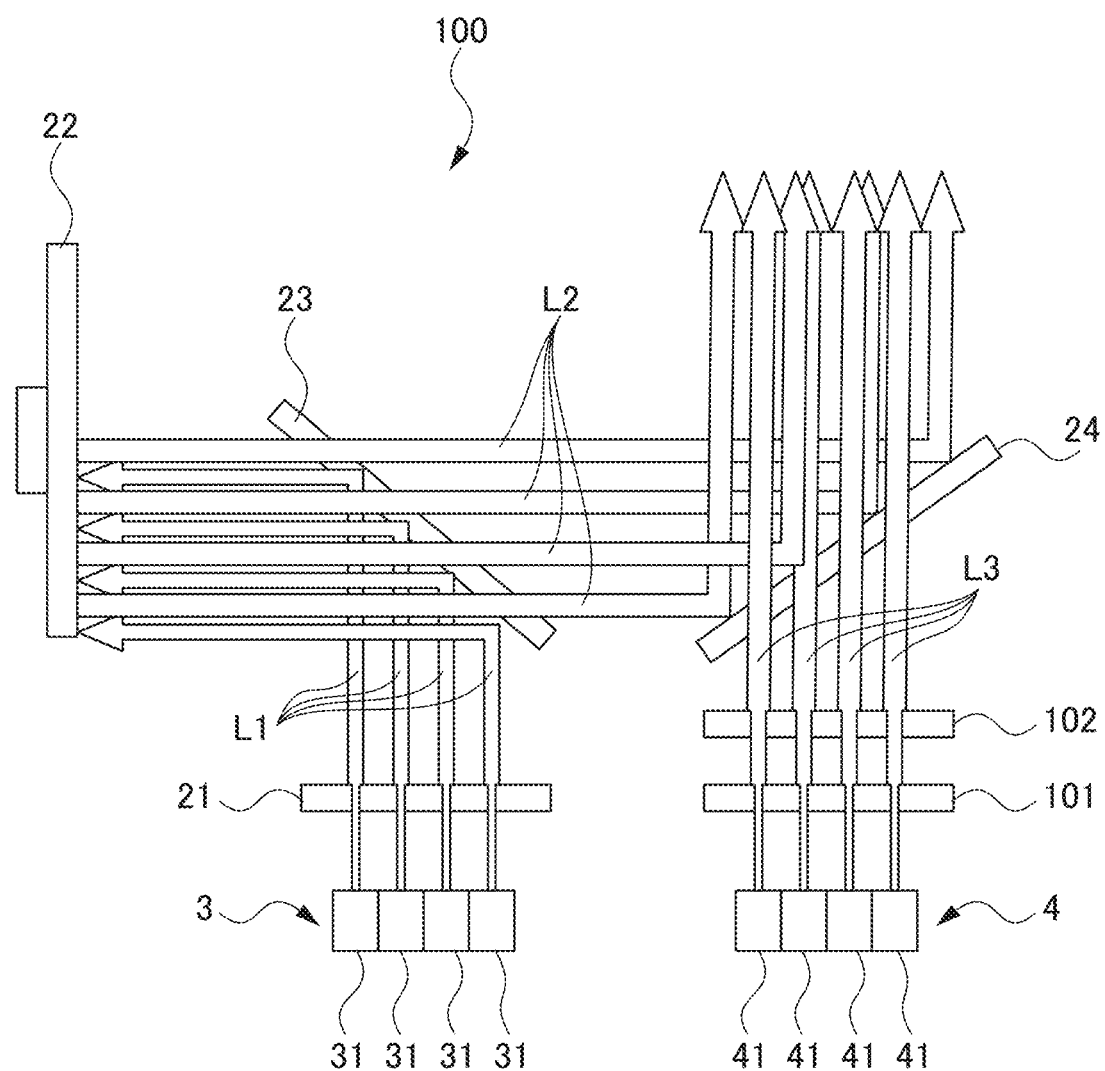
FIG. 8 is a diagram schematically illustrating a conventional optical device.

In the conventional optical device 100 illustrated in FIG. 8, portions denoted by the same reference numerals as those of the projector 2 according to the present invention illustrated in FIG. 7 indicate portions having the same configurations as those of the projector 2. The diffusion plate 101 illustrated in FIG. 8 has a plurality of lens cells having diffusion characteristics of a diffusion angle of 5° arranged on an emitting surface only, and the diffusion plate 102 has a plurality of lens cells having diffusion characteristics of a diffusion angle of 10° arranged on an emitting surface only. Since the projector 2 illustrated in FIG. 7 can perform functions equivalent to the two diffusion plates 101 and 102 with one diffusion plate 1, the projector 2 can simplify the configuration of a light radiation portion and realize downsizing and cost reduction.

EXAMPLES

Next, Examples of the present invention will be described and the present invention is not limited to these Examples.

Example 1

A resist formed of an organic material was subjected to exposure and developing using a grayscale mask to form a lens cell pattern corresponding to a desired arrangement pattern of lens cells on both surfaces of a transparent substrate formed of a glass substrate, the lens cell pattern was dry-etched to be transferred to the transparent substrate, and a double-sided diffusion plate having a lens array in which lens cells formed of concave lenses were arranged randomly on both surfaces of an incident surface and an emitting surface was manufactured.

The distance between the incident surface and the emitting surface (that is the thickness t of the transparent substrate) was 14 mm, and a refractive index n was 1.48 (wavelength λ: 455 nm). Average pitches $P_1$ and $P_2$ of the lens cells on the incident surface and the emitting surface were 82 μm, and an average radius of curvature $R_1$ of the lens cells on the incident surface was 1253 μm. A focal distance $f_1$ of the lens cells on the incident surface was −1305.2 μm. The diffusion angles of the incident surface and the emitting surface of the double-sided diffusion plate were 1.8° when measured by a diffusion angle measuring machine (a semiconductor laser profiler FFP measurement system: product of Hamamatsu Photonics Corporation). The incident light used was a laser diode (wavelength: 450 nm). The radius φ of incident light was 1 to 1.5 mm and the distance between the transparent substrate and the measuring machine was 2.8 mm.

Figure 9A:
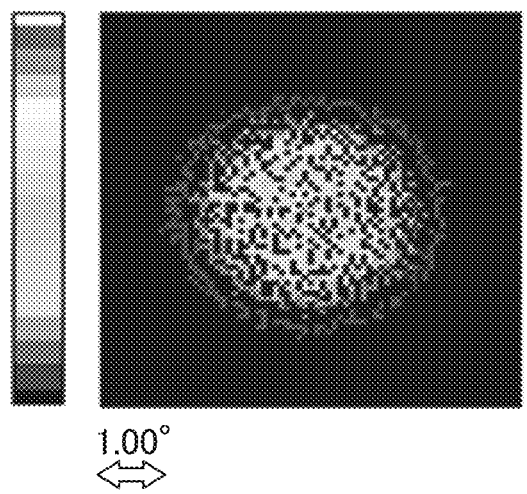
FIG. 9A is a diagram illustrating a diffusion-angle-versus-intensity distribution of a double-sided diffusion plate of Example 1.
Figure 9B:
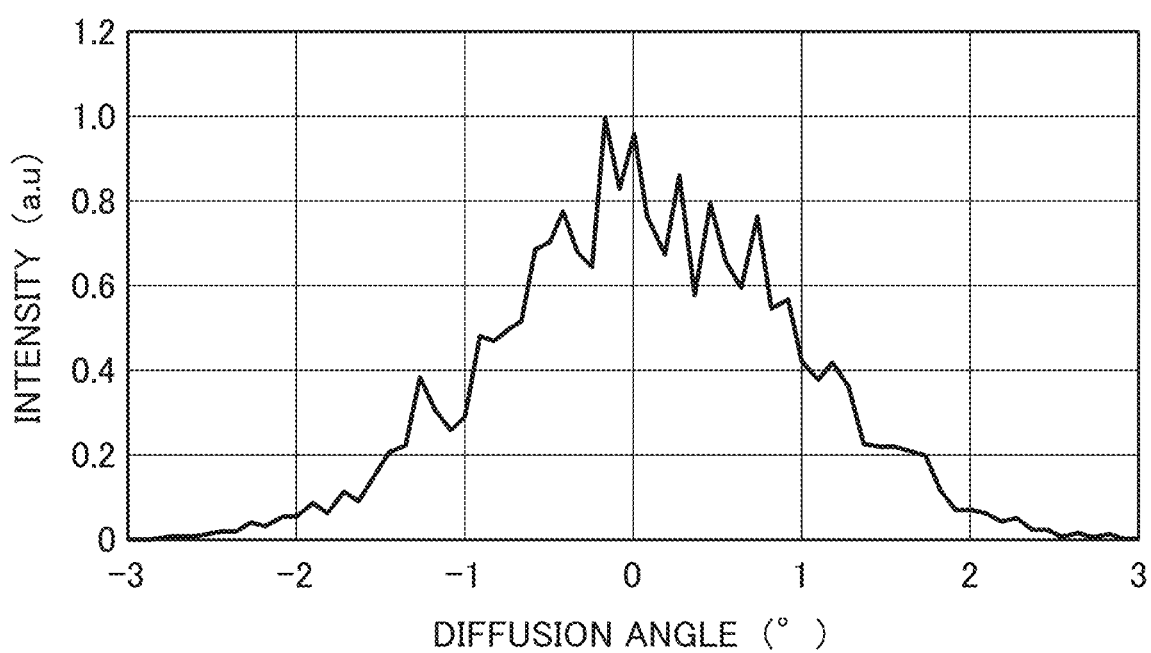
FIG. 9B is a diagram illustrating diffusion characteristics in an X-axis direction of the double-sided diffusion plate of Example 1.

In the double-sided diffusion plate, for the light having passed through the lens cells on the incident surface to be incident on at least one or more lens cells on the emitting surface, it is necessary that the average pitch $P_2$ of the lens cells on the emitting surface is 85 μm or smaller from the above-described expressions. Since the average pitch $P_2$ of the lens cells on the emitting surface of the obtained double-sided diffusion plate is 82 μm, the light emitted from the incident surface is incident on and diffused by at least one or more lens cells on the emitting surface. A diffusion-angle-versus-intensity distribution of the double-sided diffusion plate is illustrated in FIG. 9A and diffusion characteristics in the X-axis direction are illustrated in FIG. 9B.

Comparative Example 1

A single-sided diffusion plate having a lens array in which lens cells formed of concave lenses were arranged randomly similarly to Example 1 on one surface of a transparent substrate only formed of a glass substrate similar to that of Example 1 was manufactured. The diffusion angle of the single-sided diffusion plate was 1.8° when measured similarly to Example 1. A diffusion-angle-versus-intensity distribution of the single-sided diffusion plate is illustrated in FIG. 10A and diffusion characteristics in the X-axis direction are illustrated in FIG. 10B.

Comparison between Example 1 and Comparative Example 1

Figure 10A:
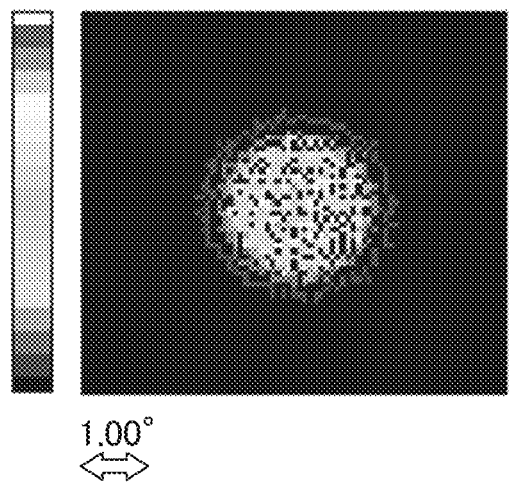
FIG. 10A is a diagram illustrating a diffusion-angle-versus-intensity distribution of a single-sided diffusion plate of Comparative Example 1.
Figure 10B:
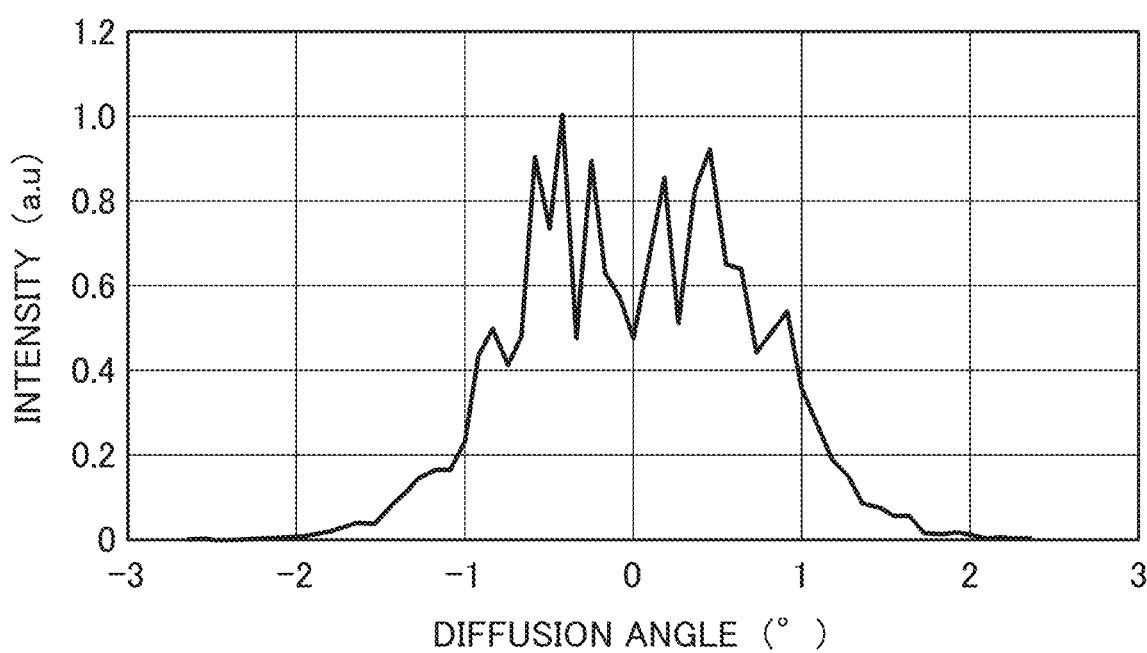
FIG. 10B is a diagram illustrating diffuson characteristics in an X-axis direction of the single-sided diffusion plate of Comparative Example 1.

When Example 1 illustrated in FIGS. 9A and 9B and Comparative Example 1 illustrated in FIGS. 10A and 10B are compared, it is clearly understood that Comparative Example 1 has many bright spots and large speckle noise as compared to Example 1. Therefore, it is understood that a double-sided diffusion plate configured such that light emitted from lens cells on the incident surface is incident on the lens cells on the emitting surface has a more excellent effect in reducing speckle noise than a single-sided diffusion plate.

Example 2

Three double-sided diffusion plates having a lens array in which lens cells formed of concave lenses were arranged randomly similarly to Example 1 on both surfaces of a transparent substrate formed of a glass substrate similar to that of Example 1 were manufactured. The diffusion angles of the three double-sided diffusion plates were 2°, 5°, and 10° on the incident surface and were 10° on the emitting surface when measured similarly to Example 1.

Figure 11A:
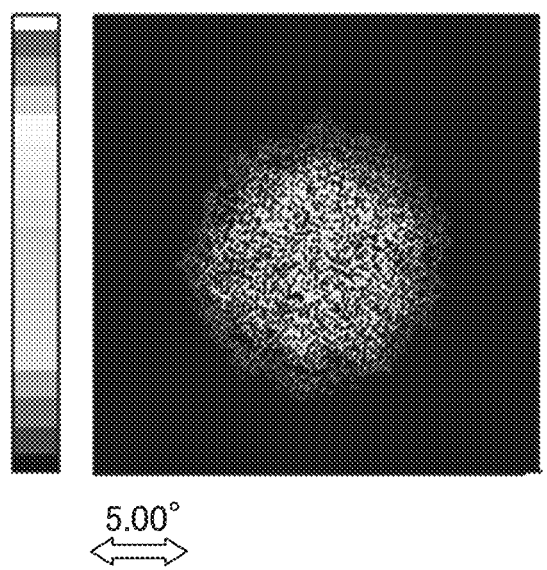
FIG. 11A is a diagram illustrating a diffusion-angle-versus-intensity distribution of a double-sided diffusion plate when a diffusion angle of an incident surface is 2° in Example 2.
Figure 11B:
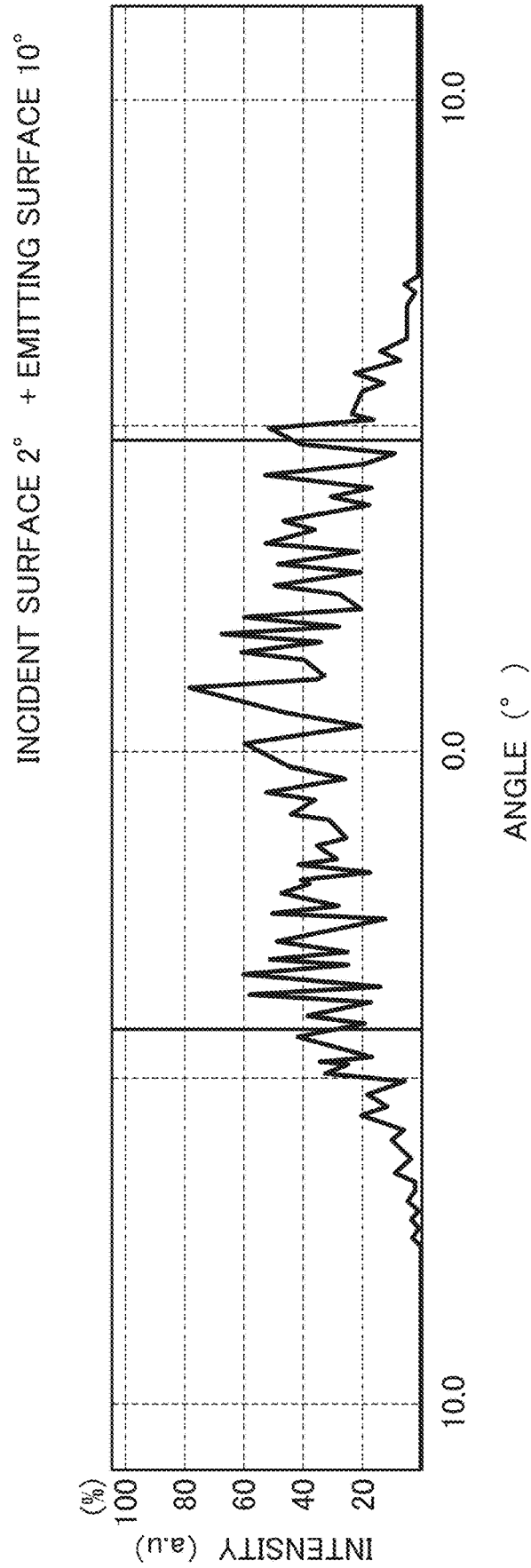
FIG. 11B is a diagram illustrating diffusion characteristics of a double-sided diffusion plate when a diffusion angle of an incident surface is 2° in Example 2.
Figure 12A:
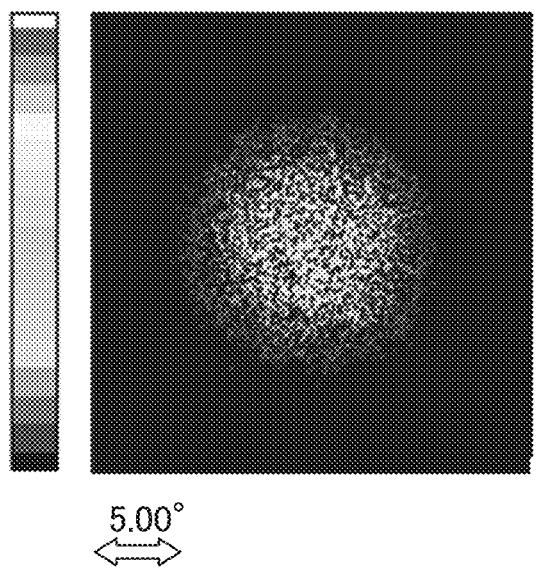
FIG. 12A is a diagram illustrating a diffusion-angle-versus-intensity distribution of a double-sided diffusion plate when a diffusion angle of an incident surface is 5° in Example 2.
Figure 12B:
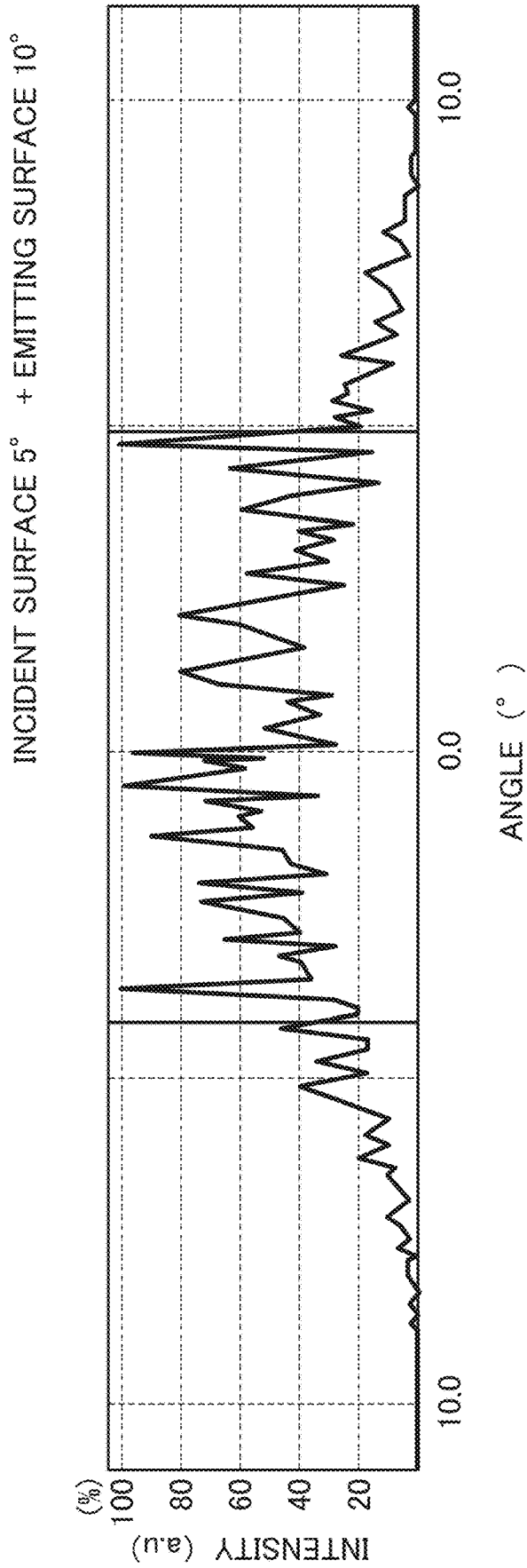
FIG. 12B is a diagram illustrating diffusion characteristics of a double-sided diffusion plate when a diffusion angle of an incident surface is 5° in Example 2.
Figure 13A:
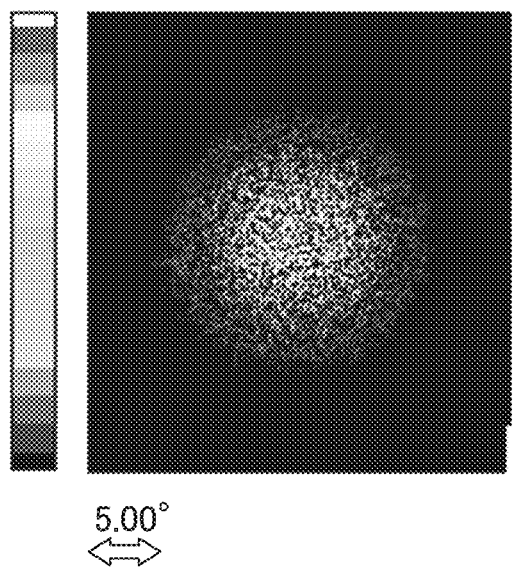
FIG. 13A is a diagram illustrating a diffusion-angle-versus-intensity distribution of a double-sided diffusion plate when a diffusion angle of an incident surface is 10° in Example 2.
Figure 13B:
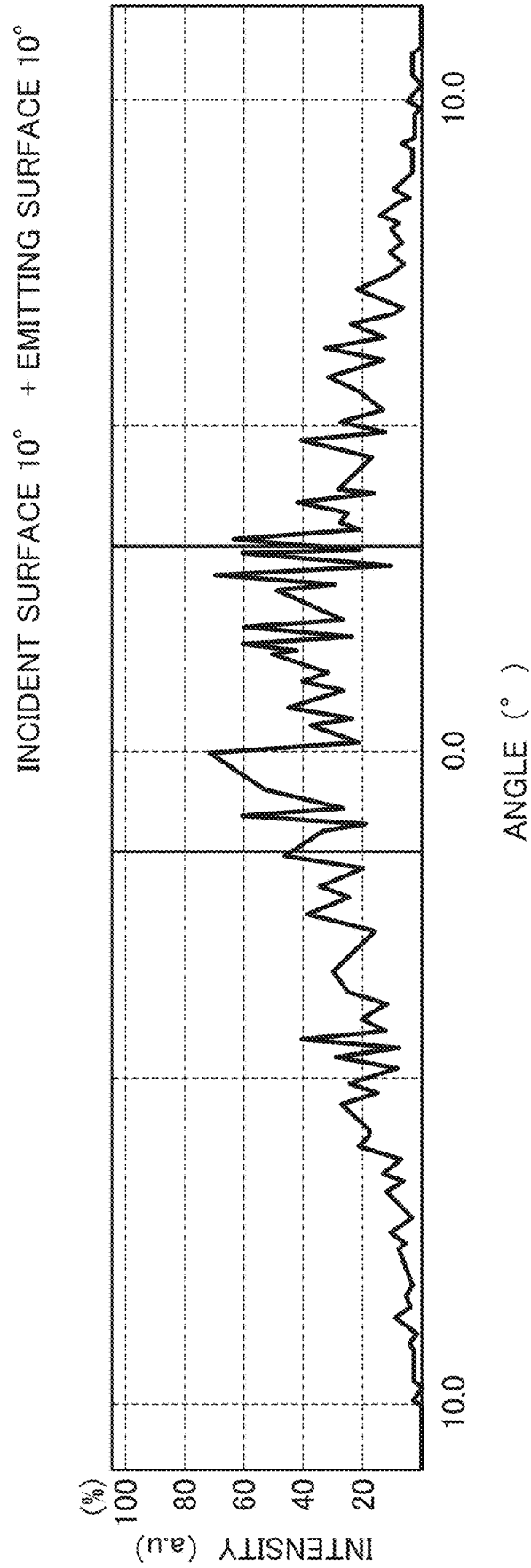
FIG. 13B is a diagram illustrating diffusion characteristics of a double-sided diffusion plate when a diffusion angle of an incident surface is 10° in Example 2.

The specifications of the double-sided diffusion plates (the thickness t of the transparent substrate, the refractive index n, the average pitches $P_1$ and $P_2$ of the lens cells, the average radius of curvature $R_1$ of the lens cells on the incident surface, and the focal distance $f_1$ of the lens cells on the incident surface) were the same as those of Example 1. When the average pitches $P_1$ and $P_2$ of the lens cells on the incident surface and the emitting surface are 82 μm, from the above-described expressions, if the diffusion angle on the incident surface is 1.68° or more, the average pitch $P_2$ of the lens cells on the emitting surface is 82 μm, and the light emitted from the incident surface is incident on and diffused by at least one or more lens cells on the emitting surface. A diffusion-angle-versus-intensity distribution of the double-sided diffusion plate in which the diffusion angle of the incident surface is 2° is illustrated in FIG. 11A and diffusion characteristics in the X-axis direction are illustrated in FIG. 11B. A diffusion-angle-versus-intensity distribution of the double-sided diffusion plate in which the diffusion angle of the incident surface is 5° is illustrated in FIG. 12A and diffusion characteristics in the X-axis direction are illustrated in FIG. 12B. A diffusion-angle-versus-intensity distribution of the double-sided diffusion plate in which the diffusion angle of the incident surface is 10° is illustrated in FIG. 13A and diffusion characteristics in the X-axis direction are illustrated in FIG. 13B.

Comparative Example 2

A single-sided diffusion plate having a lens array in which lens cells formed of concave lenses were arranged randomly similarly to Example 2 on one surface of a transparent substrate formed of a glass substrate similar to that of Example 2 was manufactured. The diffusion angle of the single-sided diffusion plate was zero on the incident surface and 10° on the emitting surface when measured similarly to Example 2. A diffusion-angle-versus-intensity distribution of the single-sided diffusion plate is illustrated in FIG. 14A and diffusion characteristics in the X-axis direction are illustrated in FIG. 14B.

Comparison between Example 2 and Comparative Example 2

Figure 14A:
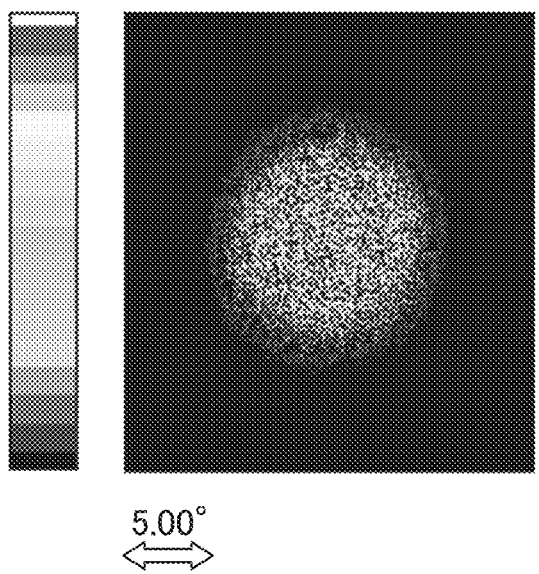
FIG. 14A is a diagram illustrating a diffusion-angle-versus-intensity distribution of a single-sided diffusion plate of Comparative Example 2.
Figure 14B:
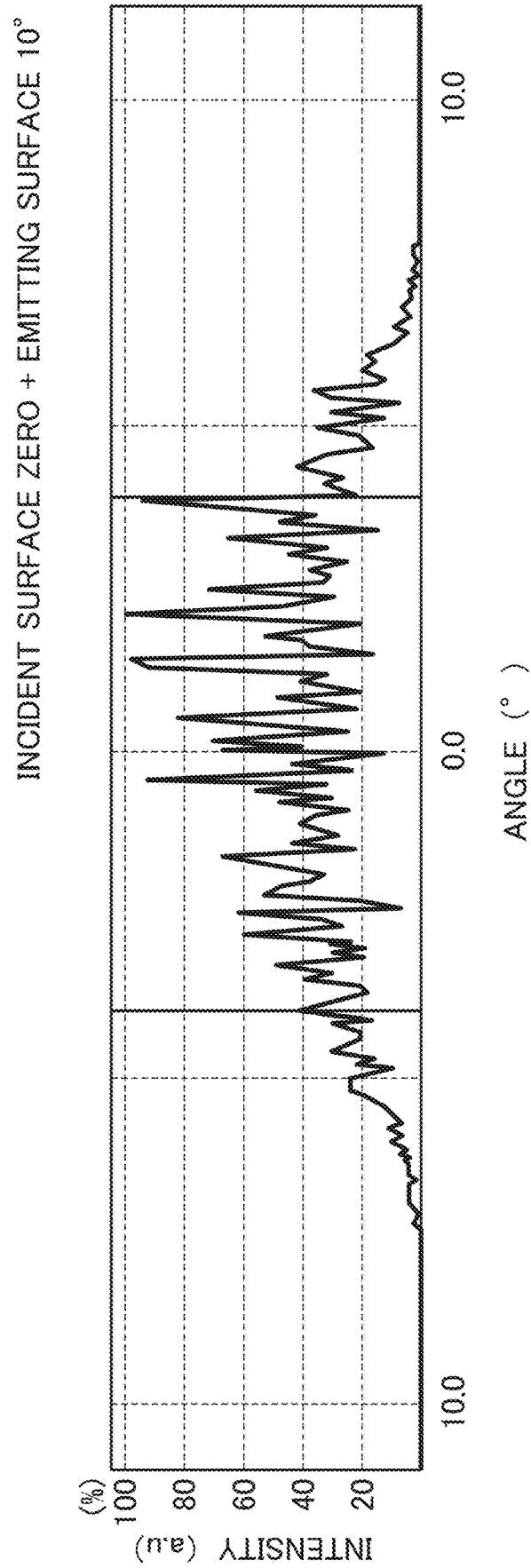
FIG. 14B is a diagram illustrating diffusion characteristics of a single-sided diffusion plate of Comparative Example 2.

When Example 2 illustrated in FIGS. 11A and 11B to FIGS. 13A and 13B and Comparative Example 2 illustrated in FIGS. 14A and 14B are compared, it is understood that the diffusion characteristics of Comparative Example 2 show a plurality of bright spots in which intensity fluctuates greatly up and down and large speckle noise as compared to Example 2. Therefore, it is understood that a double-sided diffusion plate configured such that light emitted from lens cells on the incident surface is incident on the lens cells on the emitting surface has a more excellent effect in reducing speckle noise than a single-sided diffusion plate. It can be understood from FIGS. 11A and 11B to FIGS. 13A and 13B that as the diffusion angle of the incident surface approaches the diffusion angle of the emitting surface, the diffusion characteristics change from a TOPHAT type to a Gaussian type.

Example 3

Figure 15A:
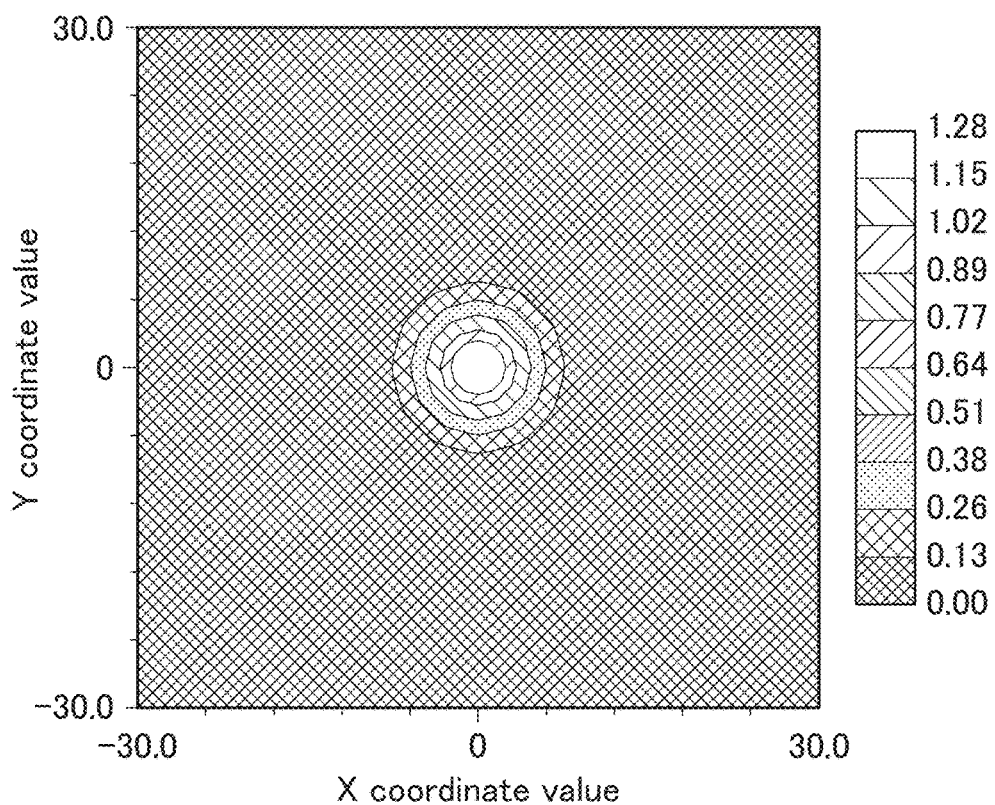
FIG. 15A is a diagram illustrating a diffusion-angle-versus-intensity distribution of a double-sided diffusion plate of Example 3.
Figure 15B:
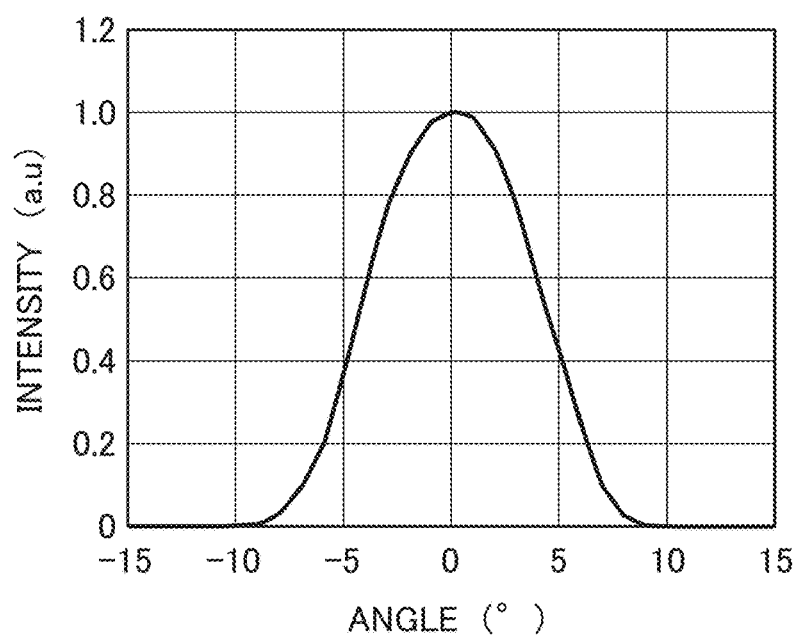
FIG. 15B is a diagram illustrating diffusion characteristics in an X-axis direction of a double-sided diffusion plate of Example 3.

Diffusion characteristics of a diffusion plate having elliptical lens cells were simulated (using OpticStudio: product name of ZEMAX corporation). Diffusion characteristics of a double-sided diffusion plate in which lens cells formed of concave lenses having a diffusion angle of 6° in the X-axis direction and a diffusion angle of 2.8° in the Y-axis direction are arranged randomly on the incident surface and in which lens cells formed of concave lenses shifted by 90° in the major axis direction and the minor axis direction of the lens cells on the incident surface and having a diffusion angle of 2.8° in the X-axis direction and a diffusion angle of 6° in the Y-axis direction are arranged randomly on the emitting surface are illustrated in FIGS. 15A and 15B. FIG. 15A illustrates a diffusion-angle-versus-intensity distribution of the double-sided diffusion plate and FIG. 15B illustrates diffusion characteristics in the X-axis direction of the double-sided diffusion plate. In this manner, when the lens cells having the same elliptical diffusion characteristics, of which the major axis direction and the minor axis direction are shifted by 90° are oriented on both surfaces of the double-sided diffusion plate, the single-sided diffusion plate and the double-sided diffusion plate have substantially the same the diffusion angle (approximately 10°) and have a Gaussian circular diffusion characteristics. That is, it is understood that the distribution of light diffusion angle is uniform in XY directions and satisfactory diffusion performance is obtained.

Comparative Example 3

Figure 16A:
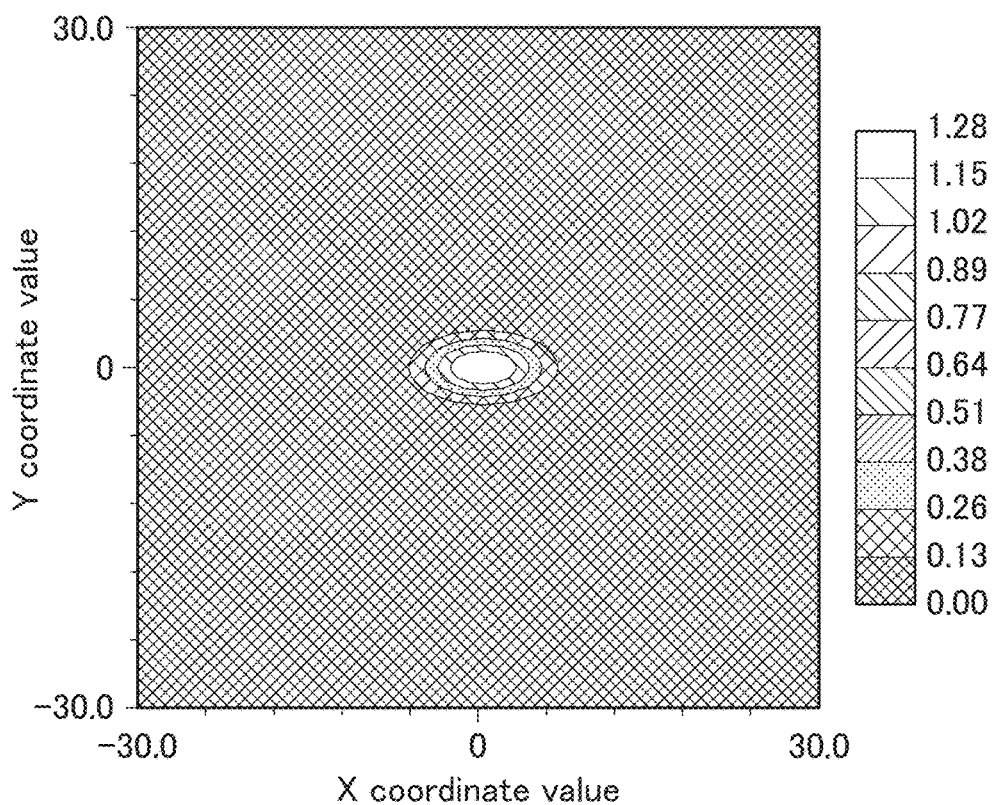
FIG. 16A is a diagram illustrating a diffusion-angle-versus-intensity distribution of a single-sided diffusion plate of Comparative Example 3.
Figure 16B:
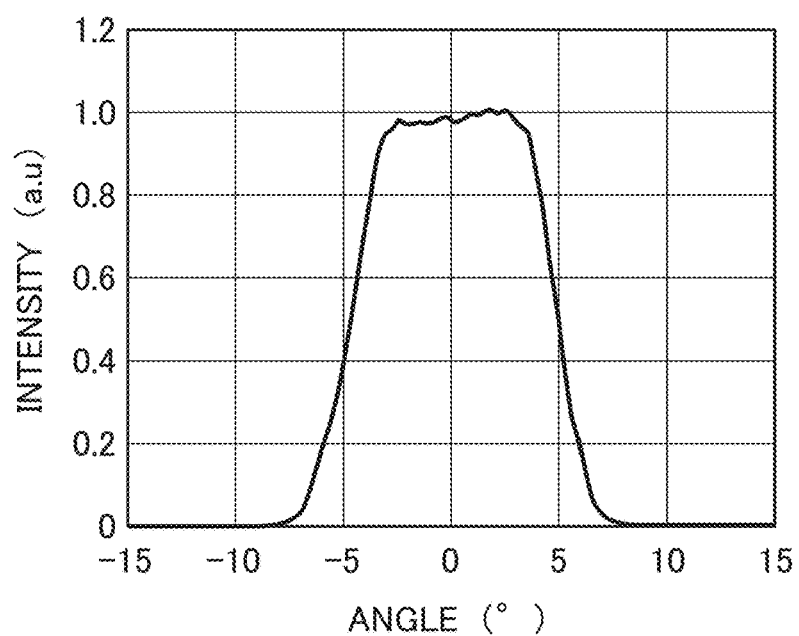
FIG. 16B is a diagram illustrating diffusion characteristics in an X-axis direction of a single-sided diffusion plate of Comparative Example 3.

Diffusion characteristics of a single-sided diffusion plate in which lens cells formed of concave lenses having a diffusion angle of 6° in the X-axis direction and a diffusion angle of 2.8° in the Y-axis direction are arranged randomly on the incident surface are illustrated in FIGS. 16A and 16B. FIG. 16A illustrates a diffusion-angle-versus-intensity distribution of the single-sided diffusion plate and FIG. 16B illustrates diffusion characteristics in the X-axis direction of the single-sided diffusion plate. In this manner, when the lens cells of the single-sided diffusion plate have an elliptical shape, the distribution of the diffusion angle of light emitted from a lens array composed of the lens cells has an elliptical shape and the distribution of the light diffusion angle is not uniform in XY directions.

EXPLANATION OF REFERENCE NUMERALS

1: Diffusion plate
10: Transparent substrate
11: Microlens cell
12A: First microlens array
12B: Second microlens array
2: Optical device

The invention claimed is:
1. A diffusion plate in which a plurality of microlens cells are arranged on both surfaces of a transparent substrate, comprising:

a first microlens array formed on one surface of the transparent substrate and having a first plurality of concave or a first plurality of convex microlens cells arranged, an entire outer periphery of each of the first plurality of concave or the first plurality of convex microlens cells being surrounded by first adjacent microlens cells in a first polygonal form in plan view; and a second microlens array formed on the other surface on a reverse side from the one surface and having a second plurality of concave or a second plurality of convex microlens cells arranged, an entire outer periphery of each of the second plurality of concave or the second plurality of convex microlens cells being surrounded by second adjacent microlens cells in a second polygonal form in plan view, wherein a shape of the microlens cells forming the first microlens array is circular or elliptical, wherein a shape of the microlens cells forming the second microlens array is circular or elliptical, wherein light emitted from microlens cells forming the first microlens array is incident on microlens cells forming the second microlens array, if an average pitch of the microlens cells of the first microlens array is P1, an average radius of curvature thereof is R1, an average pitch of the microlens cells of the second microlens array is P2, a thickness of the transparent substrate is t, and a refractive index of the transparent substrate is n, wherein the first microlens array comprises at least one microlens cell with a plurality of vertex positions that are arranged randomly within a predetermined range from vertex positions of regular lens cells as initial values, the following (Expression A) is satisfied when the microlens cells of the first microlens array have a concave shape, and the following (Expression B) is satisfied when the microlens cells of the first microlens array have a convex shape,

[Math. 6]

$$P_2 < 2\left(t + \frac{R_1}{2(n-1)}\right)\tan\left[2\sin^{-1}\left[\frac{P_1(n-1)}{2R_1}\right]/2\right] \quad \text{(Expression A)}$$

$$P_2 < 2\left(t - \frac{R_1}{2(n-1)}\right)\tan\left[2\sin^{-1}\left[\frac{P_1(n-1)}{2R_1}\right]/2\right] \quad \text{(Expression B)}$$

2. The diffusion plate according to claim 1, wherein at least one of the first and second microlens arrays is a random microlens array.

3. The diffusion plate according to claim 1, wherein the diffusion plate is formed of an inorganic material only.

4. An optical device comprising a diffusion plate according to claim 1.

5. The diffusion plate according to claim 1, wherein the first polygonal form is a rectangular form.

6. The diffusion plate according to claim 1, wherein the first polygonal form is a hexagonal form.

7. The diffusion plate according to claim 1, wherein the first polygonal form and the second polygonal form are oriented in an optical axis direction that light passes through the diffusion plate.

8. The diffusion plate according to claim 1, wherein the microlens cells forming the first microlens array comprise a plurality of inter-lens ridgelines that are not parallel between adjacent microlens cells and are not parallel to the transparent substrate.

* * * * *